No. 776,123. PATENTED NOV. 29, 1904.
G. DUFFIELD & W. B. FAIRWEATHER.
HOOF PAD.
APPLICATION FILED AUG. 3, 1903.
NO MODEL.
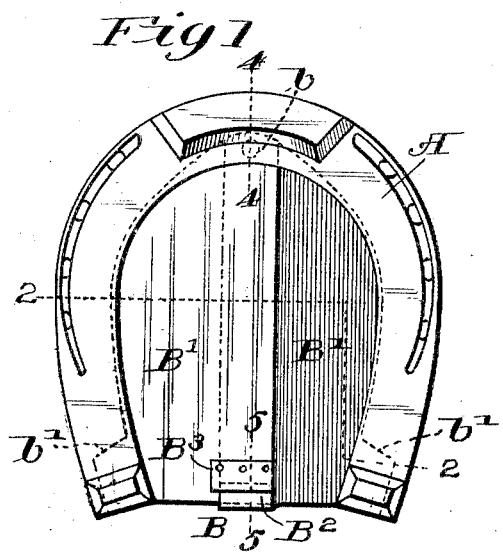
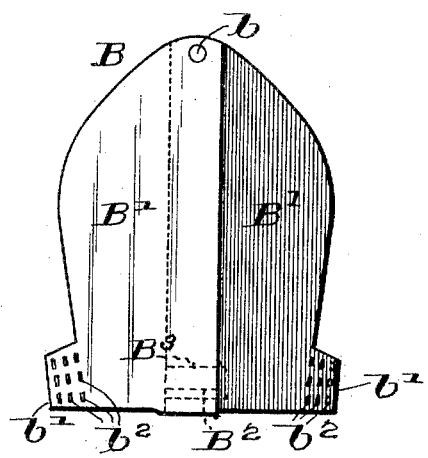
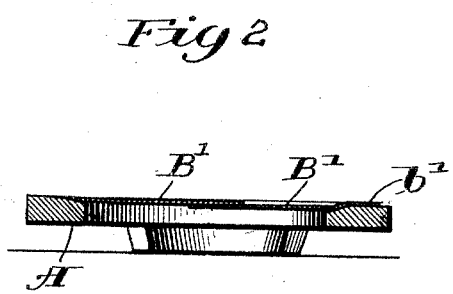
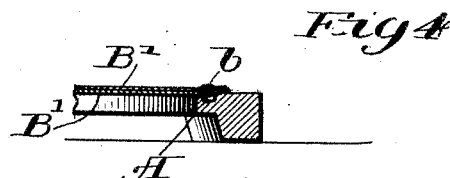
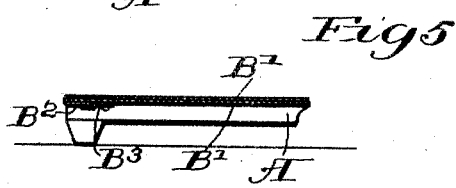
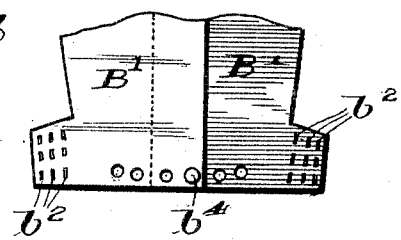
Witnesses:
Carl H. Crawford
William L. Hall
Inventors:
William B. Fairweather
George Duffield
by Poole & Brown their Attorneys No. 776,123.　　　　　　　　　　　　　　　　　　　　Patented November 29, 1904.

UNITED STATES PATENT OFFICE.

GEORGE DUFFIELD AND WILLIAM B. FAIRWEATHER, OF CHICAGO, ILLINOIS.

HOOF-PAD.

SPECIFICATION forming part of Letters Patent No. 776,123, dated November 29, 1904.

Application filed August 3, 1903. Serial No. 168,126. (No model.)

*To all whom it may concern:*

Be it known that we, GEORGE DUFFIELD and WILLIAM B. FAIRWEATHER, of Chicago, in the county of Cook and State of Illinois, have invented certain new and useful Improvements in Hoof-Pads; and we do hereby declare that the following is a full, clear, and exact description thereof, reference being had to the accompanying drawings, and to the letters of reference marked thereon, which form a part of this specification.

This invention relates to improvements in hoof-pads of that class designed to be interposed between the hoof of an animal and a shoe and constructed to shield the foot from penetration by nails and other sharp articles in the roadway.

The invention consists in the matters hereinafter set forth and more particularly pointed out in the appended claims.

In the drawings, Figure 1 is a bottom plan view of a horseshoe and a hoof-pad, the latter being made in accordance with our invention. Fig. 2 is a section taken on line 2 2 of Fig. 1. Fig. 3 is a top plan view of the hoof-pad removed from the shoe. Figs. 4 and 5 are fragmentary sections taken on lines 4 4 and 5 5 of Fig. 1. Fig. 6 is a fragmentary view of the rear end of a modification of the pad.

As shown in the drawings, A designates a horseshoe which may be made of any preferred construction.

B designates our improved pad, which is made of sheet metal, and, as herein shown, consists of two lateral members B' B', made of proper shape and dimensions to extend across the sole of the hoof between the bars of the shoe and of a length to fill the space from the front to rear thereof. Said lateral members of the pad are hinged together at their front ends by means of a rivet $b$, extending through the overlapping parts of said members, whereby said members may be swung toward and from each other in their planes to increase or diminish the width of the pad as a whole. The side members of said pad overlap each other at their adjacent margins, as clearly shown in Fig. 2. The pad is adapted to fit at its front margin between the front of the shoe and the hoof of the animal and extends substantially across the width of the shoe at the front side thereof. The side margins of the pad extend inside the inner margins of the side bars of the shoe, as shown in Fig. 2, sufficient to prevent the passage of a nail between the shoe and the margins of the pad. Said side members of the pad are provided at their side margins, near the rear ends thereof, with laterally-directed wings or lugs $b'\ b'$, which are made of sufficient length to extend almost or wholly across the rear ends of the shoe-bars and lie between said bars and the hoof. The upper surfaces of said wings or lugs are roughened and fit against the hoof of the animal, being pressed thereagainst by the shoe fitting closely against the under surfaces of the same. A convenient means of roughening said wings consists of punching holes upwardly therethrough in such manner that the metal surrounding the holes is turned upwardly beyond the upper faces thereof to constitute spurs or prongs $b^2$. One end of the rivet $b$, by which the lateral members of the pad are hinged together, extends below the lower face of the pad and is adapted to fit into a socket in the upper face of the front of the shoe, as shown in Fig. 4, whereby said rivet acts as a lock to prevent the pad from slipping laterally or backwardly. The roughened lateral wings $b'$ serve to prevent the members of the pad from swinging or shifting inwardly and serve to hold said members in their proper lateral positions. The socket in the upper face of the shoe which receives the head of the hinge-rivet $b$ may be formed therein by a punch when the shoe and pad are being fitted on the foot.

In order to prevent the rear ends of the overlapping portions of the lateral members of the pad from vertical separation, we have shown in Figs. 1 and 5 one of the said members being provided with an extension $B^2$, which is adapted to be folded downwardly and forwardly around the rear margin of the other pad member or section. In some instances we may attach a plate $B^3$ to the lowermost pad member in front of the downwardly-folded part or extension $B^2$ and which overlaps at its rear margin the forward margin of said extension and serves to prevent the said extension from being turned backwardly by contact with articles in the roadway.

In lieu of the means shown in Figs. 1 and 5 for preventing vertical separation of the overlapping members of the pad we may attach said members together by a rivet $b^4$, as shown in Fig. 6. When thus connected, it will be seen that said rivet not only serves to prevent the pad members from separating vertically, but also prevents said pad members from swinging inwardly in a manner to contract or decrease the width of the pad. In this construction the rear margins of the pad members may be perforated, as shown in said Fig. 6, and the rivet $b^4$ inserted through registering perforations, or the perforations or apertures may be formed in the pad members at the time the pad is being fitted in place.

The pad shown is exceedingly simple in its construction and economical to manufacture, and the means by which it is attached to the foot are such as to insure a reliable attachment to prevent the pad from becoming loose on the foot so long as the shoe remains in proper position thereon. Another advantage of the pad herein shown is that while it may be made of a material amply strong to resist penetration by nails and other sharp objects it need not be made of such heavy material that when pressed upwardly against the sole of the foot it will be held pressed against the sole of the foot by reason of its own stiffness. The last-suggested action of a pad would prove a serious objection, for the reason that any considerable pressure exerted by the pad against the sole of the foot might result in lameness, especially if the sole of the foot be inclined to tenderness.

The pad members or sections may be made to overlap as much or as little as conditions or preference dictates. Ordinarily, however, it will be preferable to overlap said members somewhat more than is shown in the accompanying drawings. The overlapping of the pad members serves to greatly strengthen the central part of the pad against penetration thereof by nails, and at the same time the two thicknesses of the pad at this part do not tend to assume a permanent shape when bent up against the hoof, as would a single thickness of metal of equal resisting properties against penetration.

We claim as our invention—

1. A hoof-pad comprising two lateral sheet-metal members which have overlapping engagement at their inner margins from the front to the rear ends of the pad, a rivet extending through the overlapping parts of the members at the front end of the pad to constitute a hinge and adapted to enter a notch in the upper face of the front end of the shoe and wings projecting laterally from the side margins of said members at the rear end of the pad and adapted to fit between the rear ends of the shoe and the hoof.

2. A hoof-pad comprising two lateral sheet-metal members which have overlapping engagement at their inner margins from the front to the rear ends of the pad, a rivet extending through the overlapping parts of the members at the front end of the pad to constitute a hinge and adapted to enter a notch in the upper face of the front end of the shoe and wings projecting laterally from the side margins of said members at the rear end of the pad and adapted to fit between the rear ends of the shoe and the hoof, said wings being roughened on their upper faces.

3. A hoof-pad comprising two lateral sheet-metal members which have overlapping engagement at their inner margins, a rivet extending through the overlapping front ends of said members and constituting a hinge therefor, said rivet projecting downwardly from the lower face of the pad and adapted to fit in a socket in the upper face of the front end of the shoe, and wings projecting laterally from the side margins of said members at the rear end of the pad and adapted to fit between the hoof and the rear ends of the shoe.

4. A hoof-pad comprising two lateral sheet-metal members which have overlapping engagement at their inner margins, a rivet extending through the overlapping front ends of said members and constituting a hinge therefor, said rivet projecting downwardly from the lower face of the pad and adapted to fit in a socket in the upper face of the front end of the shoe, wings projecting laterally from the side margins of said members at the rear end of the pad and adapted to fit between the hoof and the rear ends of the shoe, and means for preventing lateral separation of the overlapping rear ends of said members.

5. A sheet-metal hoof-pad made continuous from front to rear thereof and provided on its rear side margins with lateral wings or extensions adapted to fit between the rear ends of the shoe and the hoof, and at its front end with an extension adapted to fit between the toe of the shoe and the toe of the hoof, and a rivet extending vertically through the front extension of the pad and adapted to enter a notch in the upper face of the front end of the shoe.

6. A sheet-metal hoof-pad made continuous from front to rear thereof and provided at its side margins at the rear end thereof with narrow, laterally-extending, integral wings adapted to fit between the rear ends of the shoe and the hoof and at its front end with an extension adapted to fit between the toe of the shoe and the toe of the hoof, and a part extending through the front end of the pad and below the same and adapted to enter a socket in the upper face of the front of the shoe, said pad having holding engagement with the shoe and hoof only at said lateral and front extensions thereof.

7. A thin sheet-metal hoof-pad provided at the side margins of its rear part with lateral wings or extensions adapted to fit between the rear ends of the shoe and the hoof and provided at its front end with a thin extension adapted to fit between the toe of the shoe and the toe of the hoof, and a rivet extending through the said forward extension of the pad and provided with a head adapted to enter a notch in the upper face of the toe end of the shoe.

In testimony that we claim the foregoing as our invention we affix our signatures, in presence of two witnesses, this 5th day of June, A. D. 1903.

GEORGE DUFFIELD.
WILLIAM B. FAIRWEATHER.

Witnesses:
WILLIAM L. HALL,
GEORGE R. WILKINS.